United States Patent [19]

Achelpohl

[11] Patent Number: 4,682,524
[45] Date of Patent: Jul. 28, 1987

[54] APPARATUS FOR CUTTING STACKS OF FLAT WORKPIECES

[75] Inventor: Fritz Achelpohl, Lengerich, Fed. Rep. of Germany

[73] Assignee: Windmöller & Hölscher, Lengerich, Fed. Rep. of Germany

[21] Appl. No.: 769,330

[22] Filed: Aug. 26, 1985

[30] Foreign Application Priority Data

Sep. 3, 1984 [DE] Fed. Rep. of Germany ....... 3432385

[51] Int. Cl.⁴ ............................ B26D 5/02; B26F 1/04
[52] U.S. Cl. .......................................... 83/151; 83/155; 83/227; 83/549; 83/560; 83/563; 83/925 CC
[58] Field of Search ................ 83/549, 552, 563, 564, 83/277, 560, 925 CC, 91, 151, 155

[56] References Cited

U.S. PATENT DOCUMENTS

| | | | |
|---|---|---|---|
| 3,225,686 | 12/1965 | Clements | 83/563 X |
| 3,448,645 | 6/1969 | Graf et al. | 83/560 X |
| 3,858,473 | 1/1975 | Bystron | 83/925 CC X |
| 3,972,260 | 8/1976 | Hayashi et al. | 83/549 |
| 4,475,424 | 10/1984 | Kouno et al. | 83/549 |
| 4,589,183 | 5/1986 | Achelpohl | 29/426.5 |

FOREIGN PATENT DOCUMENTS 2915689 10/1980 Fed. Rep. of Germany .

Primary Examiner—Frank T. Yost
Assistant Examiner—Hien H. Phan
Attorney, Agent, or Firm—Fleit, Jacobson, Cohn & Price

[57] ABSTRACT

Apparatus for cutting stacks of flat workpieces, particularly of undershirt-shaped bags from stacked tubular film sections made of thermoplastic material and formed with side gussets and with top and bottom end seam welds. The apparatus includes a group of two punch-and-die sets, which are mounted in a transversely movable machine frame and include punches associated with drive means for moving the punches up and down, and die plates, which are fixed to the machine frame, and also includes a conveyor for intermittently feeding the stacks to and for removing them from the punches and dies. At least two punch-and-die sets and a drive motor associated with them are arranged in a row in a carriage, which is guided for reciprocation in the machine frame in a direction which is transverse to the direction of travel of the stacks. The carriage is adapted to be secured in the machine frame in two operating positions, in each of which at least one of the punch-and-die sets protrudes laterally from the machine frame.

5 Claims, 3 Drawing Figures

APPARATUS FOR CUTTING STACKS OF FLAT WORKPIECES

BACKGROUND OF THE INVENTION

1. Field of the Invention

This invention relates to apparatus for cutting stacks of flat workpieces, particularly of making undershirt-shaped bags from stacked tubular film sections made of thermoplastic material and formed with side gussets and with top and bottom end seams welds. The apparatus includes punch-and-die sets, which are mounted in a machine frame and include punches associated with drive means for moving said punches up and down, and die plates, which are fixed to the machine frame, and also including a conveyor for intermittently feeding the stacks between, and for removing them from, the punches and dies.

2. Description of the Prior Art

In general apparatus tubular film section cutting as is from Published German Application No. 29 15 689 and from Published German Application No. 33 31 069 (corresponding to U.S. patent application Ser. No. 644,280 filed Aug. 27, 1984 now U.S. Pat. No. 4,589,183) and is used to make undershirt-shaped bags. However the punches and dies become dull after a relatively short time so that the dull punches and dies must be reground or replaced after relatively short intervals of time, and the machine is inoperative for relatively long times.

SUMMARY OF THE INVENTION

It is an object of the invention so to improve tubular film section cutting so apparatus that the operation need not be interrupted for an appreciable time when the punches and dies have become dull.

This object is accomplished in accordance with the invention in that at least two punch-and-die sets and the drive means associated with them are arranged in a row in a carriage, which is quided for reciprocation in the machine frame in a direction which is transverse to the direction of travel of the stacks. The carriage is adapted to be arrested in the machine frame in two operating positions, in each of which at least one of the punch-and-die sets protrudes laterally from the machine frame. In the apparatus in accordance with the invention the number of the punch-and-die sets for cutting the stacks is doubled and one-half of the punch-and-die sets are in an operating position at a time, whereas the other set or sets has or have been displaced to a position of rest, in which it is or they are preferably disposed outside the machine frame, so that the punches and die plates of said set or sets can be reground or replaced. A punch and die which have been sharpened or replaced can be moved to their operating position simply in that the carriage is transversely displaced over the required distance. That displacement can be effected during the time in which a new stack is being formed so that the operation of the machine need not be interrupted. The increase in the structural expenditure which is due to the doubling of the punch-and-die sets is relatively small relative to the overall value of the machine. For this reason the additional costs will soon be paid off by the elimination of the standstill times which would otherwise be required.

The carriage suitably consists of a frame comprising crosspieces for the upper and lower parts of the punch-and-die sets, and the carriage frame is supported by rollers, whcih are rotatably mounted in the machine frame. The side walls of the machine frame are formed with windows, through which the carriage is adapted to be extended.

DESCRIPTION OF THE PREFERRED EMBODIMENT

Figure 1:
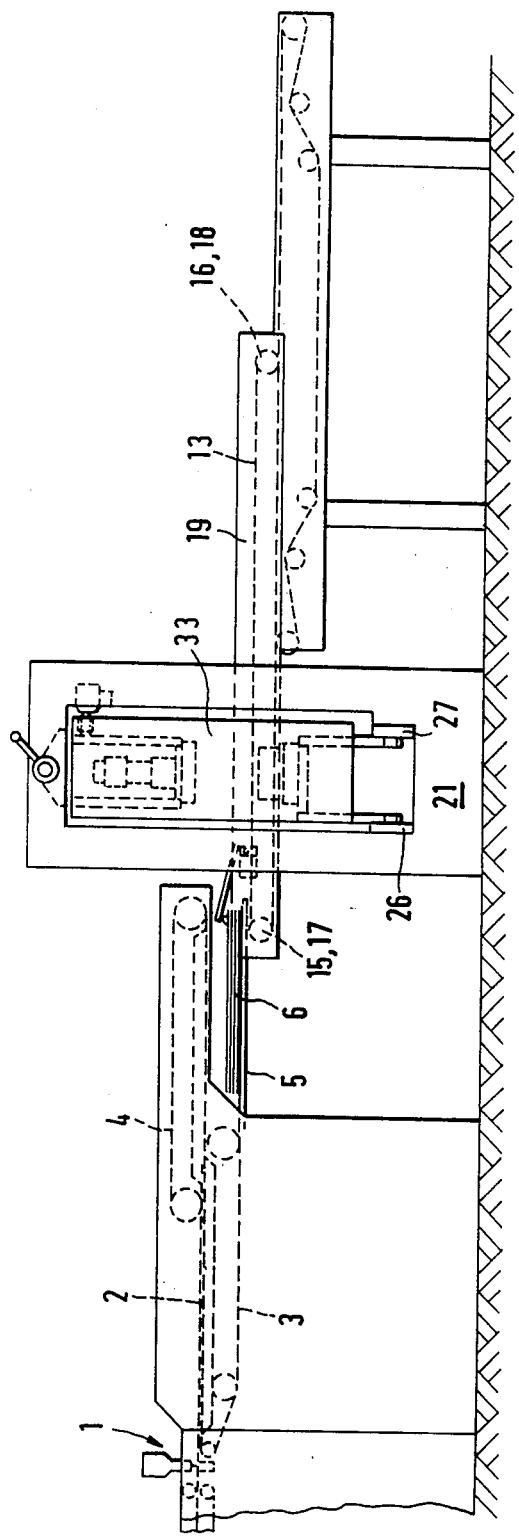
FIG. 1 is a side elevation diagrammatically showing apparatus for forming stacks of tubular film sections provided with top and bottom end seam welds and for cutting and conveying the stacks.

An illustrative embodiment of the invention will now be explained more fully with reference to the drawings.

The apparatus includes a hot wire welding apparatus 1, which is fed with three parallel flattened tubular webs formed with side gussets, and in each cycle severs three tubular film sections from the webs and provides each of them with top and bottom end seam welds.

The apparatus will not be described mainly with reference to the means for operating on one tubular web and stack because the means for acting on the other tubular webs and stacks are identical.

The tubular film sections provided with top and bottom end seam welds are first delivered to a lower vacuum conveyor belt 3 and are delivered by the latter to an upper vacuum conveyor belt 4. A stacking deck 5 is disposed under the delivery end of the upper vacuum conveyor belt 4 so that the bags 2 delivered by the belt 4 are dropped onto and stacked on the stacking deck 5. As soon as a stack 6 consisting of a desire number of bags has been formed, such stack is gripped at its leading end by gripping means 7 (see FIG. 3) and is pulled by them under a diecutting apparatus 8', which cuts off certain portions from the stack so as to form undershirt-shaped bags. The gripping means 7 comprises lower jaws 9, which are fixed to a crossbeam 8, and upper jaws 10, which are secured to a rotatable shaft 11 (see FIG. 2). The shaft 11 is rotatably mounted in brackets 12, which are screw-connected to the crossbeam 8.

Each of the two ends of the crossbeam 8 is engaged by an endless cogged belt 13 or 14, which is trained around two reversing pulleys 15, 16 or 17, 18 (see FIG. 1). At least one of said reversing pulleys is adapted to be reversibly driven. The reversing pulleys 15 to 18 are movably mounted in two side beams 19 and 20. Each side beam is secured by welding to a frame side wall 21 or 22, and said side walls are interconnected by crossbeams 23 and 24 by a shaft 25.

Figure 2:
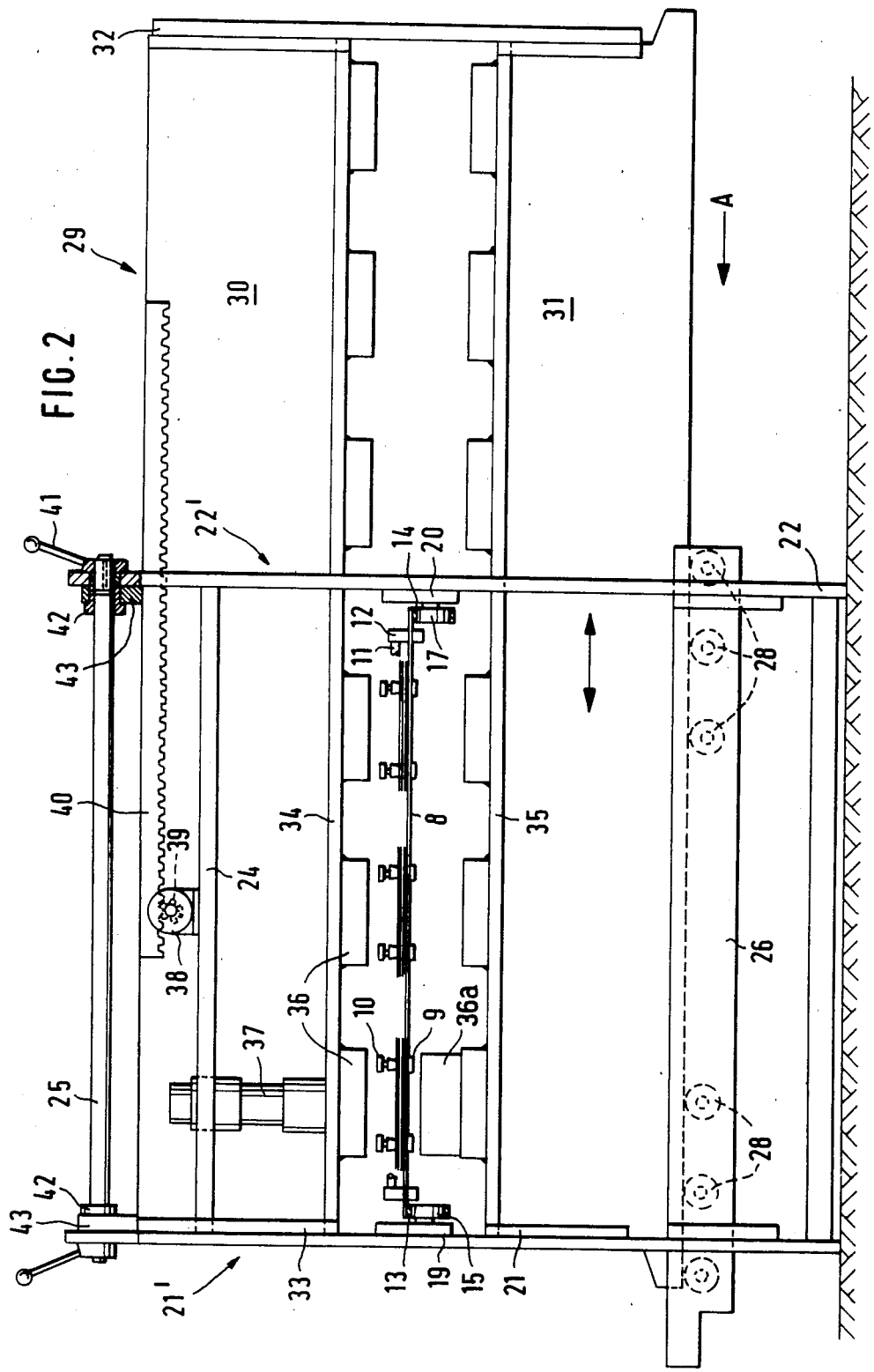
FIG. 2 is a front elevation showing on a larger scale the cutting apparatus illustrated in FIG. 1.

It is apparent from FIGS. 1 and 2 that each side wall 21, 22 is formed with a windowlike aperture 21' or 22'. Crossbeams 26 and 27 lie on and are secured to the lower edges of the apertures 21' and 22' and connect the two side walls 21 and 22 of the frame. Crossbeams 26 and 27 slightly protrude outwardly beyond the frame side walls. A plurality of supporting rollers 28 are rotatably mounted in the crossbeams 26 and 27. A cassette 29 is movably supported on supporting rollers 28. The cassette 29 consists of upper and lower side walls 30 and 31 and of end plates 32 and 33 connecting side walls 30 and 31. Two parallel, spaced apart supporting plates 34 and 35 are welded to the end plates 32 and 33 and to the side walls 30 and 31 of the cassette 29. The upper supporting plate 34 carries six punches 36 and the other supporting plate 35 carries the associated die plates 36a. For the sake of simplicity, only one piston-cylinder unit 37 is shown, which is associated with a punch 36.

Each of the punches disposed above the dies is secured to the piston rod of an associated piston-cylinder unit 37. During operation, pressure fluid is supplied only to those pressure fluid-operable piston-cylinder units which are in an operating position above conveyor belt 13, so that the punches and dies of the three other punch-and-die sets are in opertive and can be sharpened or replaced.

Figure 3:
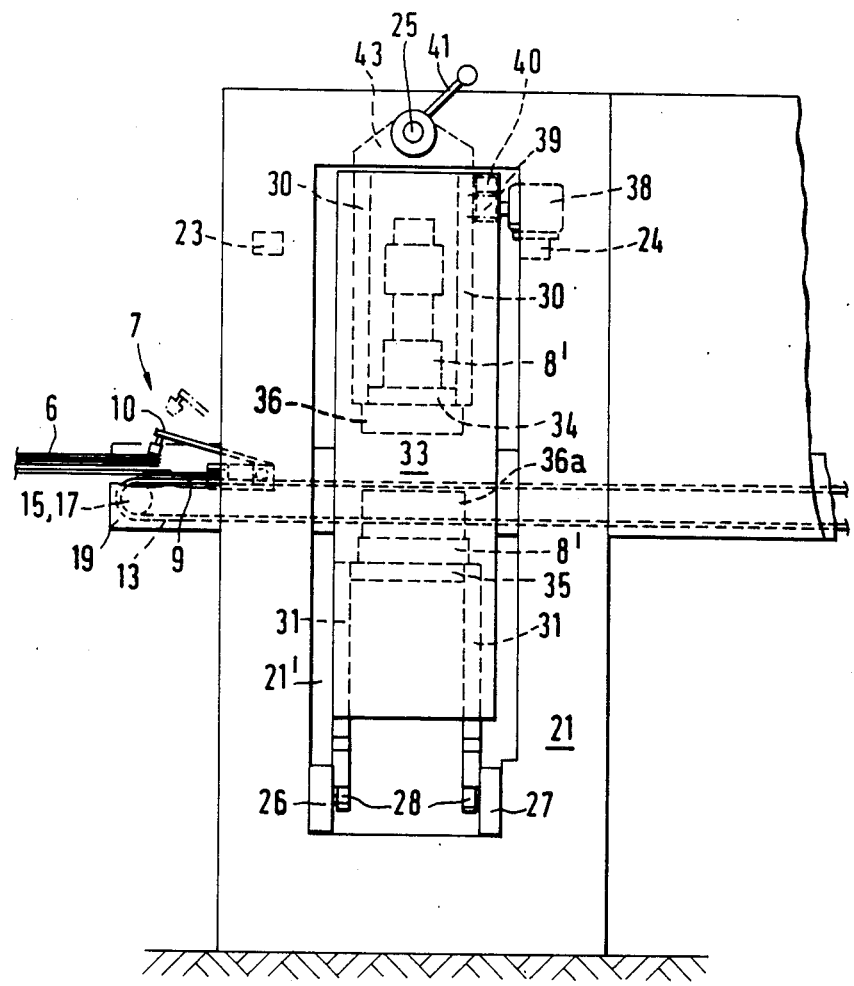
FIG. 3 is an enlarged fragmentary a side elevation showing the cutting apparatus illustrated in FIG. 2.

It is apparent from FIG. 2 that only three punches and the tree associated dies are in an operating position and may be used to cut the three stacks 6 which have been supplied so as to form undershirt-shaped bags. When the punch-and-die sets that have been used have become dull, the motor 38 mounted on the crossbeam 24 is started to drive a pinion 39 in mesh with a rack 40, which is secured to the side wall 30. As a result, the entire cassette 29 is displaced in the direction indicated by the arrow A to such an extent that the three punch-and-die sets shown on the left in FIG. 2 are moved out laterally through the aperture 21', and the three punch-and-die sets shown on the right in FIG. 3 are moved laterally to the operative position. thereafter, the dull punch-and-die sets can be sharpened or replaced, whereas the operation of the machine for making undershirt-shaped bags need not be interrupted.

To secure the cassette 29 in the desired position relative to conveyor belt 13, hand levers 41 are secured to the ends of the shaft 25 and can be actuated to rotate the shaft 25 and eccentric bushings 42, which are non-rotatably connected the the shaft 25. The eccentric bushings 42 are rotatably mounted in pressure-applying members 43, which during a rotation of the eccentric bushings 42 are forced from above against the cassette 29, which is thus clamped in position between the pressure-applying members and the supporting rollers 28.

What is claimed is:

1. Apparatus for cutting stacks of flat workpieces, particularly of making undershirt-shaped bags from stacked tubular film sections made of thermoplastic material and formed with side gussets and with top and bottom end seam welds, said apparatus comprising: a machine frame, a carriage movably supported in the machine frame, punch-and-die sets mounted in the carriage and including punches associated with drive means for moving said punches up and down when some of said punch-and-die sets are operated, and die plates fixed to the carriage for cooperation with the punches, a movable conveyor carried by the machine frame for intermittently feeding the stacks between and for removing them from the punches and dies, a plurality of punch-and-die sets and punch drive means arranged in a row in the carriage, guide means for guiding the carriage for reciprocation in the machine frame in a direction which is laterally transverse to the direction of travel of the conveyor, and securing means for securing the carriage in one of two operating positions in the machine frame, at least one of said plurality of punch-and-die sets is in an operating position and is operated within the machine frame while at least one other of said plurality of punch-and-die sets protrudes laterally from and outside the machine frame so that they can be replaced or reground.

2. Apparatus according to claim 1, wherein the carriage includes a carriage frame comprising crosspieces for upper and lower parts of the punch-and-die sets, a plurality of rollers rotatably mounted in the machine frame for movably supporting the carriage frame, and the machine frame includes openings that open transversely relative to the direction of conveyor belt movement through which the carriage is adapted to be moved.

3. Apparatus according to claim 1, including drive means for transversely displacing the carriage, said drive means including a rack mounted on the carriage, a pinion for meshing engagement with said rack, and a drive motor fixed to the machine frame for rotating the pinion.

4. Apparatus according to claim 1, including eccentric pressure-applying means rotatably movably mounted in the machine frame and adapted to engage the carriage in order to hold it in position.

5. Apparatus according to claim 1, wherein six sets of punches and dies are mounted in the carriage so that three juxtaposed stacks can be cut at one time.

* * * * *